Patented Feb. 10, 1942

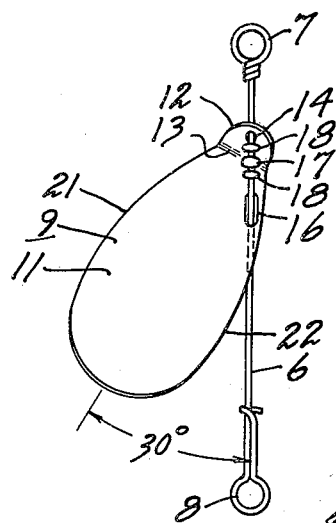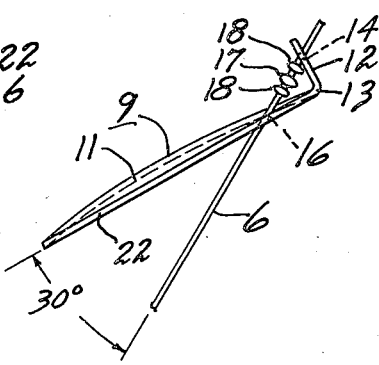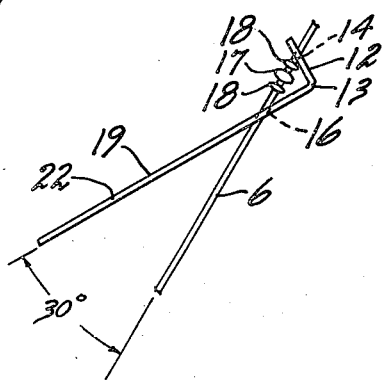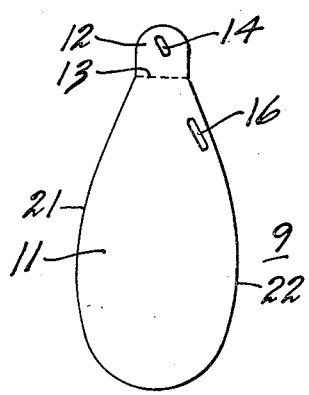

2,272,710

UNITED STATES PATENT OFFICE 2,272,710

ARTIFICIAL BAIT

Lucious K. Hoover, Birmingham, Ala.

Application April 21, 1941, Serial No. 389,515

1 Claim. (Cl. 43—45)

My invention relates to artificial bait and more particularly to what is known as a spinner for attracting fish and has for an object the provision of a spinner which is journaled on a wire for rotational movement when same is employed in casting or trolling and which will not readily become entangled in weeds or brush.

My invention further contemplates the provision of a spinner which is designed and disposed on a wire shank to provide a maximum rotational movement when moved by the passage of water.

My invention further contemplates the provision of a fish lure of the spinner type which is simple in construction, inexpensive to manufacture, and which will not readily get out of order.

My invention embodies other novel features, details of construction, and arrangement of parts which are hereinafter set forth in the specification and claims and illustrated in the accompanying drawing, forming part thereof, wherein:

Fig. 1 is a rear elevational view showing my improved spinner;

Fig. 2 is a side elevational view of same;

Fig. 3 is a side elevational view showing a modified form of my invention; and

Fig. 4 is a plan view showing the spinner blank as it appears prior to the forming operation.

Referring now to the drawing for a better understanding of my invention, and more particularly to Figs. 1, 2, and 4, I show a lure comprising a shank 6 which is formed with an eye 7 at its upper end to receive a fishing line (not shown). A snap-loop 8 is formed at the lower end of the shank to receive a fish hook (not shown).

A spinner blade 9 is formed with an oval-shaped body portion 11 and an end portion 12 which is bent upwardly from the body portion along the bend line 13 to extend at right-angles thereto. An elongated aperture 14 is formed in the end portion 12 and is disposed at an angle with respect to the longitudinal axis of the end portion. An elongated aperture 16 is formed in the body portion 11. It will be observed that the apertures 14 and 16 are disposed to provide, approximately, a thirty degree angle between the longitudinal axis of the body portion 11 and the shank 6, as viewed in either front or side elevation. The spinner blade is held against longitudinal displacement along the shank 6 by means of a shoulder 17 formed on the shank. A pair of beads 18 are mounted on the shank on opposite sides of the shoulder 17 to serve as anti-friction bearings for the spinner blade. The body portion of the spinner is preferably formed concavo-convex to facilitate its rotational movement through the water.

In Fig. 3 I show a modified form of my invention in which the body portion 19 is flat, but which is otherwise the same in construction as the form heretofore described and shown in Figs. 1 and 2 and is formed from the same blank, shown in Fig. 4.

In the operation of my fish lure, a movement of the lure through the water causes the spinner to revolve about the shank with the edge 21 serving as the leading edge and the edge 22 serving as the trailing edge.

While I have shown my invention in but two forms it is obvious to those skilled in the art that it is not so limited but is susceptible of various changes and modifications without departing from the spirit thereof.

I claim:

In a fish lure, the combination with a wire shank having a bead formed thereon, of a spinner blade having a substantially oval-shaped body portion, an offset portion projecting at substantially right angles from the forward end of the body portion, means defining an aperture in the offset portion to snugly engage the wire shank at a point above the bead, and means defining an aperture near the side edge of the body portion and adjacent the offset portion to snugly engage the wire shank at a point below the bead.

LUCIOUS K. HOOVER.